United States Patent
Sham

(10) Patent No.: US 7,808,867 B2
(45) Date of Patent: Oct. 5, 2010

(54) SYSTEM WITH READ PROTECTING FUNCTION

(76) Inventor: Wellen Sham, 7/F, No. 17, Lane 186, Sec. 6, Chung Shan North Road, Taipei (TW) 11161

(*) Notice: Subject to any disclaimer, the term of this patent is extended or adjusted under 35 U.S.C. 154(b) by 1231 days.

(21) Appl. No.: 11/344,239

(22) Filed: Feb. 1, 2006

(65) Prior Publication Data

US 2007/0192665 A1    Aug. 16, 2007

(51) Int. Cl.
G11B 7/00    (2006.01)
(52) U.S. Cl. .................. 369/53.21; 369/47.2; 369/47.19
(58) Field of Classification Search .............. 369/59.25, 369/53.21, 47.12, 47.13, 47.19, 47.2, 47.27, 369/47.21
See application file for complete search history.

(56) References Cited

U.S. PATENT DOCUMENTS

| | | | |
|---|---|---|---|
| 5,878,020 A * | 3/1999 | Takahashi | 369/59.25 |
| 6,069,953 A * | 5/2000 | Kong | 713/193 |
| 6,532,201 B1 * | 3/2003 | Hogan | 369/53.21 |
| 7,058,977 B1 * | 6/2006 | Furukawa et al. | 726/26 |
| 7,408,859 B2 * | 8/2008 | Tanaka et al. | 369/53.21 |

* cited by examiner

*Primary Examiner*—Nabil Z Hindi
(74) *Attorney, Agent, or Firm*—The Weintraub Group, P.L.C.

(57) ABSTRACT

The present invention relates to a system with read protecting function that comprises a record medium, having a data substrate with a control data zone and a data zone thereon, wherein the control data zone has a plurality of blocks, and every block has a plurality of sectors, and every sector has a plurality of bytes, and the data zone has encoded data, as well as a control code is disposed in the one of the sectors in control data zone; an optical storage device, for loading the record medium and reading and identifying the control code, then decoding the control code and outputs the decoded data if the control code is identifiable; or directly output the encoded data if the control code is not identifiable. Furthermore, the present invention relates to a method for protecting a record medium.

18 Claims, 3 Drawing Sheets

SYSTEM WITH READ PROTECTING FUNCTION

BACKGROUND OF THE INVENTION

1. Field of the Invention

The present invention relates to a system with read protecting function and a method for protecting a record medium, and more particularly to a record medium having a control data zone and a data zone with encoded data therein, when the record medium is loaded into an optical storage device, the optical storage device will read and identify the control code; then the optical storage device will decode the encoded data and output the decoded data if the control code is identifiable; or the optical storage device will directly output the encoded data if the control code is not identifiable.

2. Description of the Related Art

In general, audio and video files can be downloaded from a server and played in a DVD or CD player by means of a simple security check according to a prior art. However, the security check may be skipped by users, and thus DVD or CD publishers cannot request users to pay for the downloaded files and thus the unauthorized use of DVD or CD media becomes more and more.

At present, there are systems or solutions that can solve the problem of protecting DVD or CD from unauthorized copying. For example, U.S. Pat. No. 5,991,403 issued to Aucsmith, et al disclosed a method for encoding MPEG compatible video data for subsequent compression that comprises detecting a plurality of frames of video data organized as a GOP, generating an encryption key for the GOP, and encrypting the video data using GOP-synchronized substitution, transposition, and rotation transformations that are parameterized by offsets derived from the generated encryption key.

U.S. Pat. No. 5,915,018 issued to Aucsmith, et al disclosed a cryptographic system and method for secure distribution and management of cryptographic keys for use in a DVD copy protection scheme. A DVD disc having compressed, encrypted content written on a first portion of the disc, and the content encryption key, itself encrypted with a second key and written out of band on a second portion of the disc is used to provide content, key, and control information to a DVD player.

U.S. Pat. No. 5,991,403 is used for coding MPEG compatible video data for subsequent compression, and U.S. Pat. No. 5,915,018 is a cryptographic system and method for secure distribution and management of cryptographic keys for use in a DVD copy protection scheme. However, these patented technologies all used the encryption key or cryptographic key to manage the data encrypting or decrypting of the CD or DVD. But the structure of the encryption key or cryptographic key was relative complex, furthermore, this method needs to pay more royalty fee to the publishers, filmmakers or computer companies, so as to increased the cost of the CDs or DVDs, therefore, the sale price of the CDs or DVDs could not be reduced.

SUMMARY OF THE INVENTION

Therefore, it is a primary objective of the present invention to overcome the foregoing shortcomings of the prior art by providing a system with read protecting function, which comprises a record medium, having a control data zone and a data zone with encoded data therein, when the record medium is loaded into an optical storage device, the optical storage device will read and identify the control code; then the optical storage device will decode the encoded data and output the decoded data if the control code is identifiable; or the optical storage device will directly output the encoded data if the control code is not identifiable.

Another objective of the present invention is to overcome the foregoing shortcomings of the prior art by providing a method for protecting a record medium, which comprises a record medium, having a control data zone and a data zone with encoded data therein, when the record medium is loaded into an optical storage device, the optical storage device will read and identify the control code; then the, optical storage device will decode the encoded data and output the decoded data if the control code is identifiable; or the optical storage device will directly output the encoded data if the control code is not identifiable.

To achieve the foregoing objectives, a system with read protecting function in accordance with the present invention comprises: a record medium, having a data substrate with a control data zone and a data zone thereon, wherein the control data zone has a plurality of blocks, and every block has a plurality of sectors, and every sector has a plurality of bytes, and the data zone has encoded data, as well as a control code is disposed in the control data zone; an optical storage device, having a mechanism for loading the record medium and reading as well as identifying the control code therein, then decoding the encoded data and outputs the data if the control code is identifiable; or directly output the encoded data if the control code is not identifiable.

To achieve the foregoing objectives, a method for protecting a record medium, which comprises the steps of: providing a record medium, wherein the record medium has a data substrate with a control data zone and a data zone thereon, wherein the control data zone has a plurality of blocks, and every block has a plurality of sectors, and every sector has a plurality of bytes, and the data zone has encoded data; writing a control code to one of the sectors in control data zone; encoding the main data and then writing to the data zone; providing an optical storage device with a decoding mechanism; loading the record medium into the optical storage device; and the optical storage device reading the control code and identifying the control code, then decodes the encoded data then outputs if the control code is identifiable; or directly outputs the encoded data if the control code is not identifiable.

DETAILED DESCRIPTION OF THE PREFERRED EMBODIMENTS

Figure 1A:
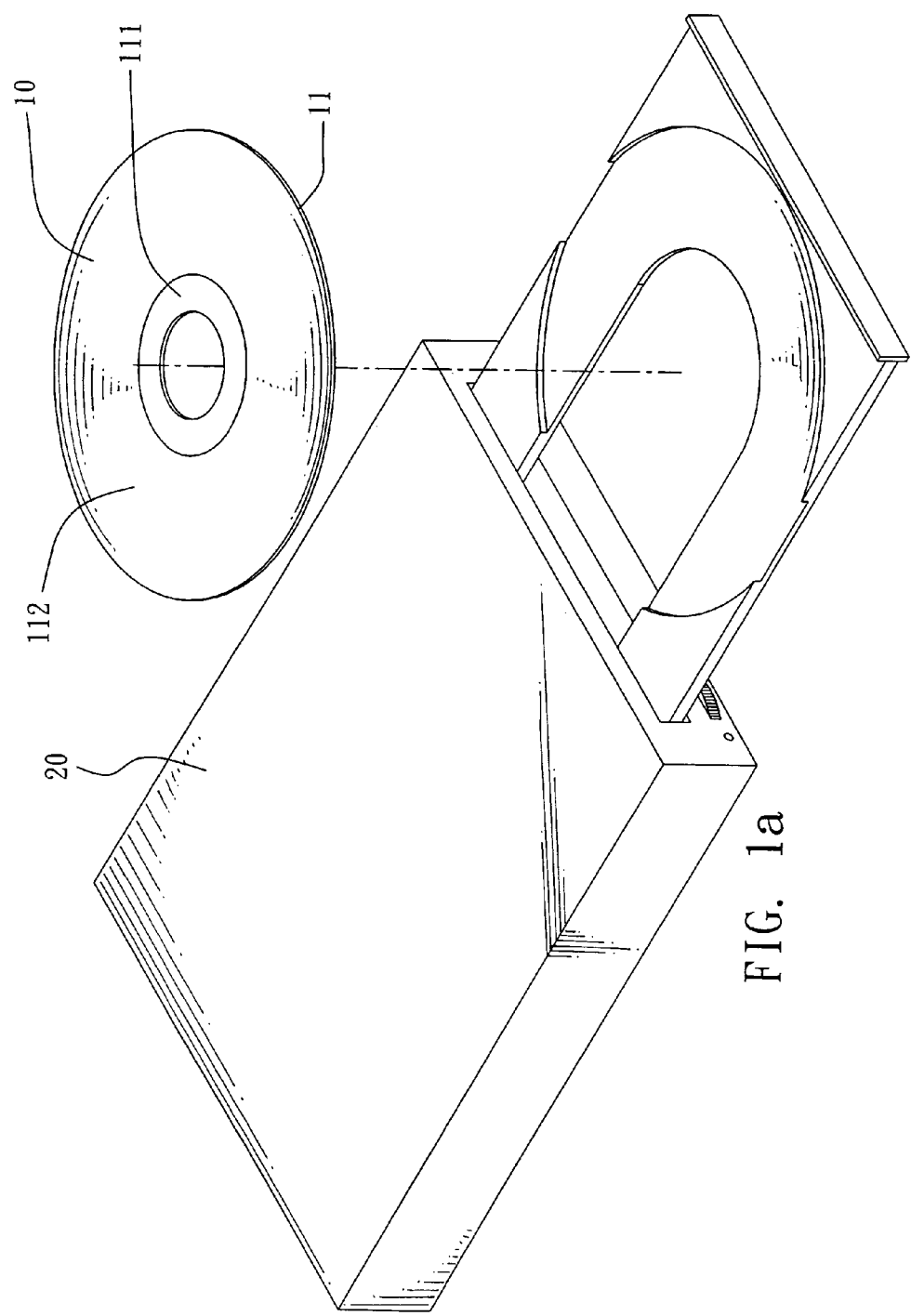
FIG. 1a is a block diagram of a system with read protecting function according to a preferred embodiment of the invention.
Figure 1B:
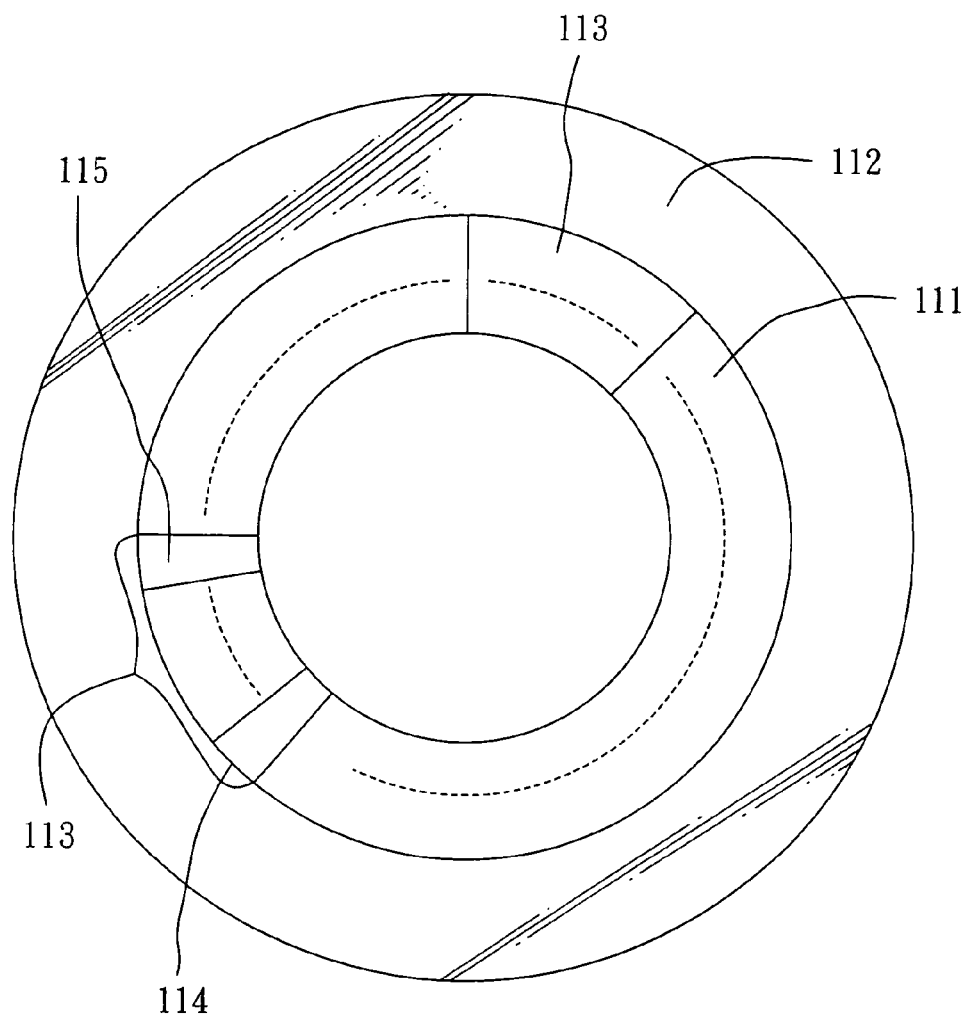
FIG. 1b is an enlarged view of a record medium 10 according to a preferred embodiment of the invention.

Referring to FIGS. 1a and 1b, which shows a block diagram of a system with read protecting function and an enlarged view of a record medium 10, respectively, according to a preferred embodiment of the invention. As shown in the FIG. 1a, the system with read protecting function of the present invention comprises: a record medium 10 and an optical storage device 20.

Wherein, the record medium 10, for example but not limited to a CD, CD-R, DVD-ROM, DVD-R, HDDVD-ROM, BD-ROM, BD-R or HDDVD-R, comprises a data substrate 11 with a control data zone 111 and a data zone 112 thereon; wherein the control data zone 111 has a plurality of blocks 113 (please refer to FIG. 1b), for example but not limited to 192 blocks; and every block 113 has a plurality of sectors 114, for example but not limited to 16 sectors; and every sector 14 has a plurality of bytes, for example but not limited to 2K bytes; and the data zone 112 has encoded data, for example but not limited to a computer software, an image file or an audio file; as well as a control code 115 with 4~6 bytes length is disposed in the one of the sectors 114, for example but not limited to the first and second sectors. The control code 115 is provided for being identified by the optical storage device 20, and the control code 115 could be a production serial number, a random serial number or an authorizing number of the computer software, an image file or an audio file.

The data substrate 11 is made of plastic material, for example but not limited to a polycarbonate (PC).

The optical storage device 20, for example but not limited to a CD player/recorder or a DVD player/recorder, could load the record medium 10 and read the control code 115 therein and has a decoding mechanism (not shown) for decoding the encoded data of the data zone 115; wherein, the decoding mechanism of the optical storage device 20 is co-operated with the encoding mechanism of the record medium 10, the encoding mechanism of the record medium 10 is for example but not limited to a MPEG-1, MPEG-2, MPEG-4 or Reed-Soloman encoding mechanism, and the decoding mechanism of the optical storage device 20 is also for example but not limited to a MPEG-1, MPEG-2, MPEG-4 or Reed-Soloman decoding mechanism.

The optical storage device 20 of the present invention is a dedicated system with specific decoding mechanism, while the general optical storage device does not comprise the decoding mechanism for decoding the encoded data in the data zone 112 of the record medium 10, and also does not check the control code 115 of the control data zone 111. The optical storage device 20 of the present invention comprises not only the decoding mechanism for decoding the encoded data in the data zone 112 of the record medium 10, but also reads and identifies the control code 115 of the control data zone 111 when the record medium 10 is loaded into the optical storage device 20; such as if the control code 115 has 4~6 bytes length, the producer of the record medium 10 could write the production serial number, random serial number or authorizing number of the computer software, image file or audio file into the control data zone 111, and some certain bits with specific pattern of this control code are provided for identifying by the optical storage device 20; such optical storage device 20 has the decoding mechanism and it could recognize the control code 115 in the control data zone 111; and the optical storage device 20 will decode the encoded data and then output the data if it could identify the control code 115; or the optical storage device 20 will read the encoded data then directly output if it could not identify the control code 115, thus the user will view a non-decoded screen. Therefore, by the way of combining the record medium 10 and optical storage device 20 provided by the present invention can really achieve the goals of read protecting and prevent from illegally copying; for this reason the contents provider is willing to reduce the sale price of the CDs or DVDs; therefore, the system with read protecting function of the present invention can overcome the shortcomings of the prior arts.

Figure 2:
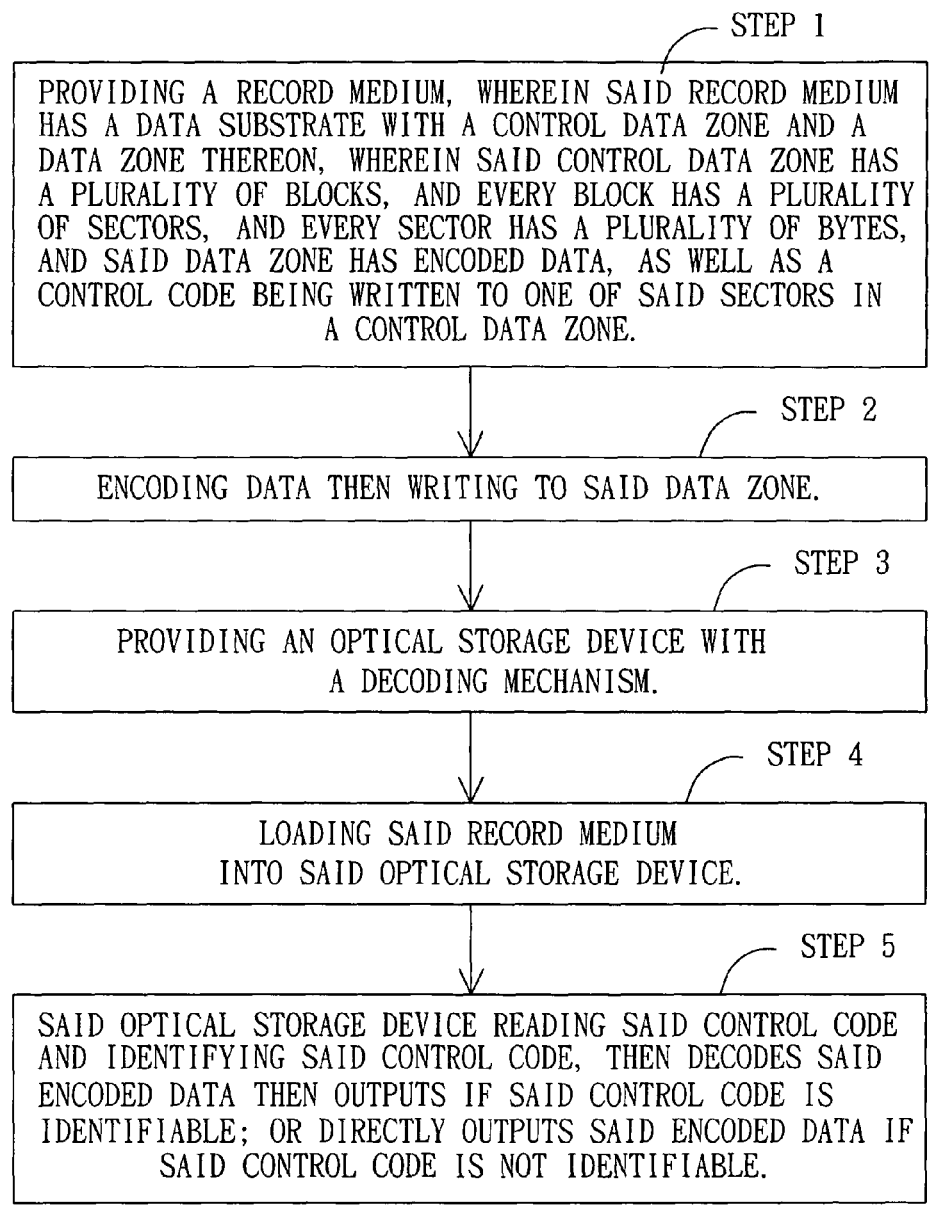
FIG. 2 is a flowchart of a method for protecting a record medium according to one preferred embodiment of the invention.

Furthermore, the present invention also provides a method for protecting a record medium. Referring to FIG. 2, it shows a flowchart of a method for protecting a record medium according to one preferred embodiment of the invention. As shown in the FIG., the method for protecting a record medium of the present invention comprises the steps of: providing a record medium 10, wherein the record medium 10 has a data substrate 11 with a control data zone 111 and a data zone 112 thereon, wherein the control data zone 111 further has a plurality of blocks 113, and every block 113 has a plurality of sectors 114, and every sector 114 has a plurality of bytes, and the data zone 112 has encoded data; writing a control code 115 to one of the sectors 114 (step 1); encoding the main data then writing to the data zone 112 (step 2); providing an optical storage device 20 with a decoding mechanism (step 3); loading the record medium 10 into the optical storage device 20 (step 4); and the optical storage device 20 reading the control code 115 and identifying the control code 115, then decodes the encoded data and then outputs if the control code is identifiable; or directly outputs the encoded data if the control code is not identifiable (step 5).

In the steps 1~2, the record medium 10, for example but not limited to a CD, CD-R, DVD-ROM, DVD-R, HD DVD-ROM or HD DVD-R, comprises a data substrate 11 with a control data zone 111 and a data zone thereon 112; wherein the control data zone 111 has a plurality of blocks 113 (please refer to FIG. 1b), for example but not limited to 192 blocks; and every block 113 has a plurality of sectors 114, for example but not limited to 16 sectors; and every sector 14 has a plurality of bytes, for example but not limited to 2K bytes; and the data zone 112 has encoded data, for example but not limited to a computer software, an image file or an audio file; as well as a control code 115 with 4~6 bytes length is disposed in the one of the sectors 114, for example but not limited to the first and second sectors. The control code 115 is provided for being identified by the optical storage device 20, and the control code 115 could be a production serial number, a random serial number or an authorizing number of the computer software, an image file or an audio file. The data substrate 11 is made of plastic material, for example but not to a polycarbonate (PC).

In the step 3, the optical storage device 20 of the present invention is a dedicated system with specific decoding mechanism (not shown) which can read the control code 115 and decode the encoded data of the data zone 112 of the record medium 10. Wherein, the decoding mechanism of the optical storage device 20 is co-operated with the encoding mechanism of the record medium 10, the encoding mechanism of the record medium 10 is for example but not limited to a MPEG-1, MPEG-2, MPEG-4 or Reed-Soloman encoding mechanism, and the decoding mechanism of the optical storage device 20 is also for example but not limited to a MPEG-1, MPEG-2, MPEG-4 or Reed-Soloman decoding mechanism.

In the steps 4~5, the optical storage device 20 of the present invention comprises not only the decoding mechanism for decoding the encoded data of the data zone 112 of the record medium 10, but also reads and identifies the control code 115 of the control data zone 111 when the record medium 10 is loaded into the optical storage device 20; such as if the control code 115 has 4~6 bytes length, the producer of the record medium 10 could write the production serial number, random serial number or authorizing number of the computer software, image file or audio file into the control data zone 111, and some certain bits with specific pattern of this control code are provided for identifying by the optical storage device 20; such optical storage device 20 has the decoding mechanism and it could recognize the control code 115 in the control data zone 111; and the optical storage device 20 will decode the encoded data then output the data if it could identify the control code 115; or the optical storage device 20 will read the encoded data then directly output if it could not identify the control code 115, thus the user will view a non-decoded screen. Therefore, the method for protecting a record medium of the present invention can really achieve the goal of read protecting and prevent from illegally copying; for this reason the contents provider is willing to reduce the sale price of the CDs or DVDs; therefore, the method for protecting a record medium of the present invention can overcome the shortcomings of the prior arts.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A system with read protecting function, comprising:
   (a) a record medium having a data substrate;
       (1) a control data zone having a plurality of blocks, each block having a plurality of sectors, and every sector having a plurality of bytes;
       (2) a data zone;
       (3) encoded data embedded on said data zone;
       (4) a control code disposed in said control data zone;
   (b) an optical storage device for loading said record medium comprising a decoding mechanism for identifying said control code and outputting decoded data when said control code is identifiable and outputting said encoded data if said control code is not identifiable.

2. The system with read protecting function of claim 1, wherein said recording medium further includes a transparent substrate, wherein said data substrate and said transparent substrate are plastic.

3. The system with read protection function of claim 2, wherein said plastic is polycarbonate.

4. The system with read protecting function of claim 1, wherein said control data zone has 192 blocks, every block has 32K bytes divided into 16 sectors of 2K bytes, and said control code has 4~6 bytes length.

5. The system with read protecting function of claim 4, wherein said control code is at least one of a production serial number, a random serial number and an authorizing number.

6. The system with read protecting function of claim 1, wherein said record medium is a CD, CD-R/RW, DVD-ROM, DVD-R/RW, HD DVD-ROM, BD-ROM, BD-R/RE or HD DVD-R/RW.

7. The system with read protecting function of claim 1, wherein said optical storage device is at least one of a CD player/recorder or a DVD player/recorder.

8. The system with read protecting function of claim 1, said record medium further comprising:
   an encoding mechanism which cooperates with said decoding mechanism of said optical storage device to decode said encoded data.

9. The system with read protecting function of claim 8, wherein said encoding mechanism of said record medium is a MPEG-1, MPEG-2, MPEG-4 or Reed Soloman encoding mechanism, and said decoding mechanism of said optical storage device is a MPEG-1, MPEG-2, MPEG-4 or Reed Soloman decoding mechanism.

10. A method for protecting a record medium, which comprises the steps of:
    (a) providing a record medium the record medium forming a data substrate with a control data zone and a data zone, said control data zone having a plurality of blocks, each block having a plurality of sectors, and every sector having a plurality of bytes;
    (b) writing a control code to one of said sectors in said control data zone;
    (c) writing encoded data to said data zone;
    (d) providing an optical storage device with a decoding mechanism for decoding said encoded data;
    (e) loading said record medium into said optical storage device; and
    (f) wherein said optical storage device reads said control code and identifies said control code to decode said encoded data, said optical storage device outputting decoded data if said control code is identifiable, and outputting said encoded data if said control code is not identifiable.

11. The method for protecting a record medium of claim 10, further comprising:
    forming said data substrate and a transparent substrate of said record medium from plastic.

12. The method of protecting a record medium of claim 11, wherein said plastic is polycarbonate.

13. The method for protecting a record medium of claim 10, wherein said control data zone has 192 blocks, every block has 32K bytes divided into 16 sectors of 2K bytes, and said control code has 4~6 bytes length.

14. The method for protecting a record medium of claim 13, wherein said control code is at least one of a production number, a random serial number, and an authorizing number.

15. The method for protecting a record medium of claim 10, wherein said record medium is a CD, CD-R/RW, DVD-ROM, DVD-R/RW, HD DVD-ROM, BD-ROM, BD-R/RE or HD DVD-R/RW.

16. The method for protecting a record medium of claim 10, wherein said optical storage device is a CD player/recorder or a DVD player/recorder.

17. The method for protecting a record medium of claim 10, further comprising:
    providing an encoding mechanism to said record medium which cooperates with said decoding mechanism of said optical storage device to decode data embedded on said record medium.

18. The method for protecting a record medium of claim 17, wherein said encoding mechanism of said record medium is a MPEG-1, MPEG-2, MPEG-4 or Reed Soloman encoding mechanism, and said decoding mechanism of said optical storage device is a MPEG-1, MPEG-2, MPEG-4 or Reed Soloman decoding mechanism.

* * * * *